US012743675B2

(12) United States Patent
Hulick, Jr. et al.

(10) Patent No.: US 12,743,675 B2
(45) Date of Patent: Sep. 22, 2026

(54) SOFTWARE BILL OF MATERIALS TELEMETRY EXTENSIONS FOR FULL STACK OBSERVABILITY

(71) Applicant: Cisco Technology, Inc., San Jose, CA (US)

(72) Inventors: Walter Theodore Hulick, Jr., Pearland, TX (US); Thomas Szigeti, Vancouver (CA); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 18/529,404

(22) Filed: Dec. 5, 2023

(65) Prior Publication Data

US 2025/0182051 A1 Jun. 5, 2025

(51) Int. Cl.

| | |
|---|---|
| ***G06Q 10/0875*** | (2023.01) |
| ***H04L 9/30*** | (2006.01) |
| ***H04L 9/32*** | (2006.01) |

(52) U.S. Cl.

CPC ........... *G06Q 10/0875* (2013.01); *H04L 9/30* (2013.01); *H04L 9/3236* (2013.01)

(58) Field of Classification Search

CPC ...... G06Q 10/0875; H04L 9/30; H04L 9/3236

See application file for complete search history.

(56) References Cited

U.S. PATENT DOCUMENTS

| | | | |
|---|---|---|---|
| 11,030,068 B1 * | 6/2021 | Agarwal | G06F 11/327 |
| 2020/0192613 A1 * | 6/2020 | Brady | G06F 3/1232 |
| 2022/0166626 A1 * | 5/2022 | Madisetti | H04L 9/50 |
| 2022/0398324 A1 | 12/2022 | Bosch et al. | |
| 2023/0006907 A1 * | 1/2023 | Mackie | H04L 43/10 |
| 2023/0168986 A1 | 6/2023 | Larkin et al. | |
| 2024/0320624 A1 * | 9/2024 | Varghese | G06Q 20/389 |
| 2025/0110854 A1 * | 4/2025 | Chandramohan | G06F 11/3636 |

FOREIGN PATENT DOCUMENTS

| | | |
|---|---|---|
| CN | 115687522 A | 2/2023 |

OTHER PUBLICATIONS

Clerc C.L., et al., "Improve your Software Delivery with CI/CD Observability and OperTelemetry", Elastic, On-demand Webinar, Jul. 10, 2023, 2 Pages.

(Continued)

*Primary Examiner* — Aaron Tutor

(74) *Attorney, Agent, or Firm* — Lee & Hayes, P.C.

(57) ABSTRACT

In one embodiment, a method includes determining, by a device executing an observability extension that monitors an application, variables of the application that specify an accessible location for a software bill of materials of the application and generating, by the observability extension, an indication of the accessible location for the software bill of materials of the application. The method further includes detecting, by the observability extension, creation of an observability-based data structure during monitoring of execution of the application and inserting, by the observability extension, the indication of the accessible location for the software bill of materials of the application into the observability-based data structure for transmission to an end recipient of the observability-based data structure.

20 Claims, 6 Drawing Sheets

(56) References Cited

OTHER PUBLICATIONS

Federal Register: "Improving the Nation's Cybersecurity", Presidential Document, May 17, 2021, 18 Pages.
Github: "OpenTelemetry Instrumentation for Java", Retrieved on May 13, 2022, 6 Pages.
Github: "OpenTelemetry Java", Retrieved on Jul. 10, 2023, 7 Pages.
OpenTelemetry: "What is OpenTelemetry?", 2023, 3 Pages.
Villa M., "AIOps Observability: Going Beyond Traditional APM", NodeSource, Feb. 23, 2023, 8 Pages.

* cited by examiner

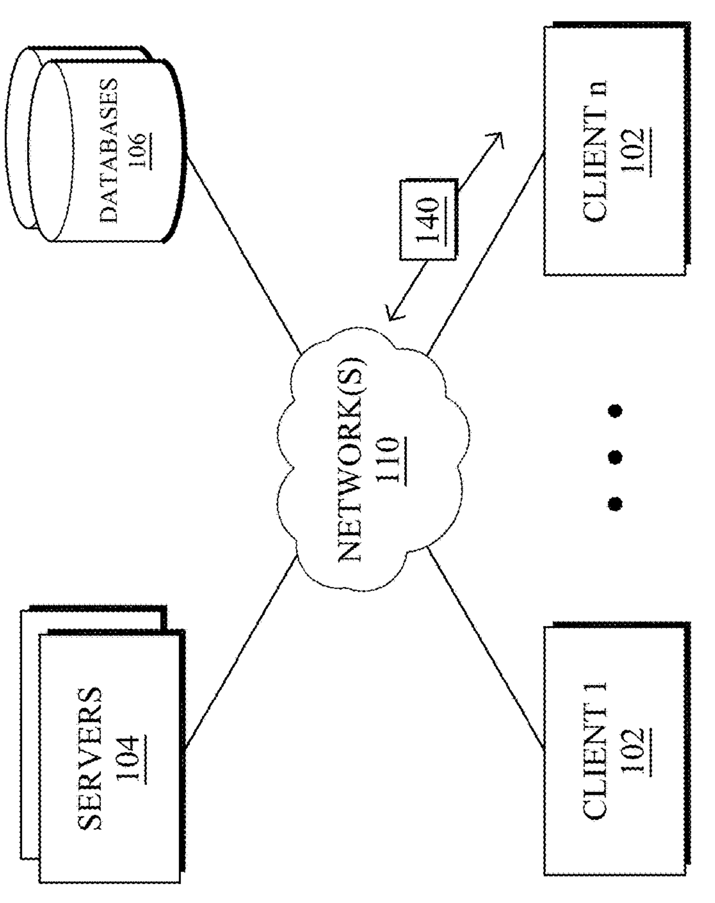
FIG. 1

500

```
// set the public url along with hash to access this application

span.setAttribute("otel.sbom.public.url", "https://www.company.com/sbom/application=fc2r3234");

// ADD Span "Mini SBOM" attributes

 span.setAttribute("otel.sbom.span.type","span type");

 span.setAttribute("otel.sbom.span.purpose","span purpose");

 span.setAttribute("otel.sbom.span.creator","com.company.class.method");

 span.setAttribute("otel.sbom.span.does.outbound.web.service.calls","true or false");

 span.setAttribute("otel.sbom.span.does.outbound.db.updates","true or false");

 span.setAttribute("otel.sbom.span.does.outbound.db.reads","true or false);

.......
```

SOFTWARE BILL OF MATERIALS TELEMETRY EXTENSIONS FOR FULL STACK OBSERVABILITY

TECHNICAL FIELD

The present disclosure relates generally to computer systems, and, more particularly, to Software Bill of Materials telemetry extensions for full stack observability.

BACKGROUND

Software Bill of Materials (SBOMs) are fast becoming a standard across the entire information technology (IT) field and allow for the quick identification of the software components involved in everything from transactions to application programming interfaces (APIs) in applications. In general, an SBOM is typically constructed today by the build system and then bundled with the software produced by that system.

SBOMs provide a formal record containing the details and supply chain relationships of various components used in building software. Traditionally, software developers and vendors often create products by assembling existing open source and commercial software components. The SBOM enumerates these components in a product. Accordingly, transparency from SBOMs aids multiple parties across the software lifecycle, including software developers, purchasers, and operators. Recognizing the importance of SBOMs in transparency and security, and that SBOM evolution and refinement should come from the community to maximize efficacy, the Cybersecurity and Infrastructure Security Agency (CISA) is facilitating listening sessions around SBOM with the aim of advancing the understanding of SBOM creation, use, and implementation across the broader technology ecosystem within the software and security community.

A main source of SBOMs are web applications and microservices that are spread across the internet where customers and/or consumers may not have access to the SBOMs that map to these applications. It is traditionally up to the customer and/or consumer of an application to find it and assess such applications, particularly to assess for various risks (e.g., business risks, etc.) when utilizing these applications. This can be a manual and often tedious process, ostensibly making access to the SBOMs private except under certain conditions, such as customers and/or consumers specifically requesting SBOMs for particular applications from vendors that provide such applications.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example computer network;

FIG. 5 illustrates an example a span mini-SBOM pseudocode in accordance with one or more embodiments described herein.

DESCRIPTION OF EXAMPLE EMBODIMENTS

Overview

Figure 2:
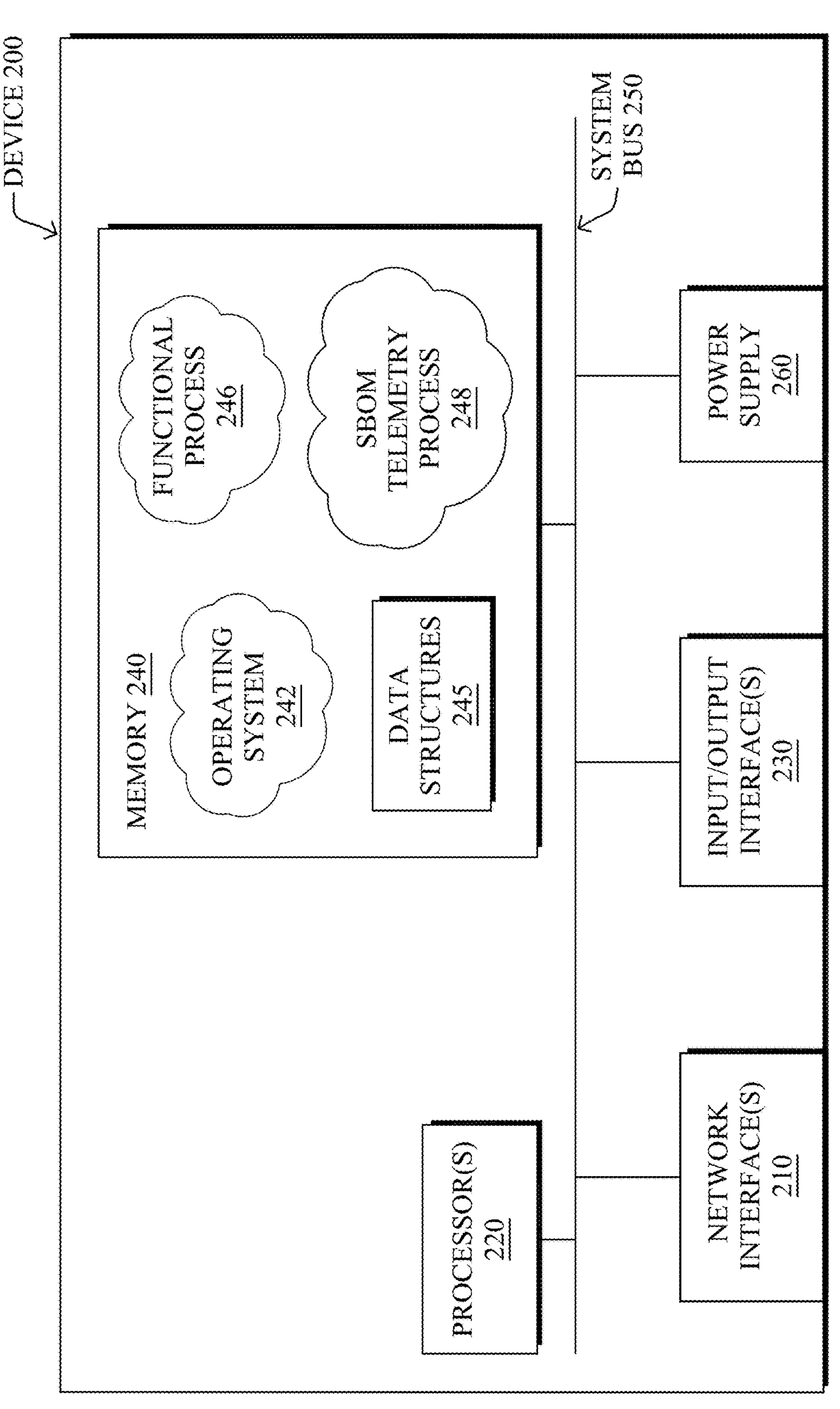
FIG. 2 illustrates an example computing device/node.

According to one or more embodiments of the disclosure, a method for Software Bill of Materials telemetry extensions for full stack observability includes determining, by a device executing an observability extension that monitors an application, variables of the application that specify an accessible location for a software bill of materials of the application. The observability extension then generates an indication of the accessible location for the software bill of materials of the application. The observability extension detects creation of an observability-based data structure during monitoring of execution of the application and inserts the indication of the accessible location for the software bill of materials of the application into the observability-based data structure for transmission to an end recipient of the observability-based data structure.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of a simplified example of a computing system 100 illustratively comprising any number of client devices (devices 102, e.g., a first through nth client device), one or more servers (servers 104), and one or more databases (databases 106), where the devices may be in communication with one another via any number of networks (networks 110). The networks 110 may include, as would be appreciated, any number of specialized networking devices such as routers, switches, access points, etc., interconnected via wired and/or wireless connections.

For example, devices 102-104 and/or the intermediary devices in networks 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Devices 102 may include any number of user devices or end point devices configured to interface with the techniques herein. For example, devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via networks 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor (processor 220), and a memory 240 interconnected by a system bus 250, as well as a power supply 260 (e.g., battery, plug-in, etc.).

The one or more network interfaces 210 contain the mechanical, electrical, and signaling circuitry for communicating data over links coupled to the network 110. The network interfaces may be configured to transmit and/or receive data using a variety of different communication protocols. Note, further, that device 200 may have multiple types of network connections via the one or more network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the one or more network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (functional processes 246), and on certain devices, an illustrative "SBOM telemetry" process (process 248), as described herein. Notably, functional processes 246, when executed by processor 220, cause each particular device (device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
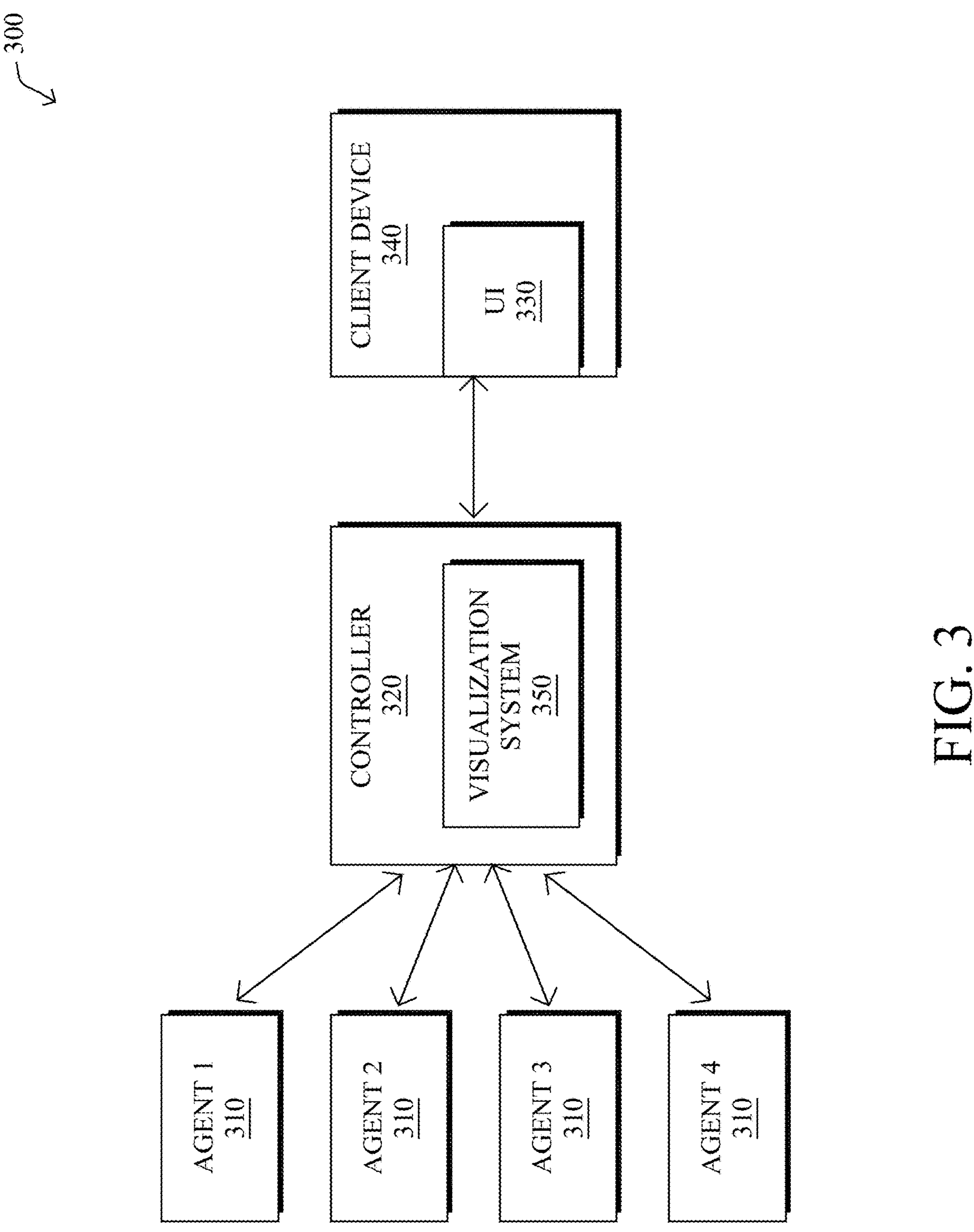
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (agents 310) and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controllers 320 (or controllers) as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) (interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of the controller 320 may be hosted remotely by a provider of the observability intelligence platform 300. In an illustrative on-premises (On-Prem) implementation, an instance of the controller 320 may be installed locally and self-administered.

The controllers (controller 320) receive data from different agents (agents 310) (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID)

(e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Software Bill of Materials Telemetry Extensions for Full Stack Observability—

As noted above, with the increasing prevalence of Software Bill of Materials (SBOMs) in software systems, it is becoming more and more important for customers and consumers of these software systems to avail themselves to the benefits of accessing the SBOMs. That being said, it is currently generally up to the customer or consumer of the software system to find the SBOMs to assess the software system for various risks, such as for business risks. However, gaining access to the SBOMs in order to find and assess such risks often a manual and therefore tedious process.

The techniques herein, therefore, provide mechanisms to provide access to SBOMs associated with software systems in the absence of tedious, manual processes that are currently employed. For example, aspects of the present disclosure can allow for observability to SBOMs through detection, retrieval, and/or analysis of telemetry data associated with SBOMs. In one or more embodiments, such detection, retrieval, and/or analysis can include automatic detection of Open Telemetry (OTEL) spans generated during application tracing of mission critical application transactions to retrieve and/or analyze SBOMS.

As will be discussed in more detail herein, an observability plugin extension (e.g., an OTEL plugin extension) is provided that can have the ability to be "SBOM Aware" and can therefore automatically publish a uniform resource locator (URL) of an SBOM associated with a host application (e.g., an application hosted by a company or provider of the software system). In addition to, or in the alternative, the observability plugin extension can automatically detect and/or publish SBOM information that is written to a public registry. This can allow for the creation of span attributes that may relate to a "span mini-SBOM" (e.g., distilled information corresponding to spans generated by the application) that can also include the SBOM URL associated with the host application and which can be accessed directly by a consumer and/or customer that is using the software system.

As will be appreciated, Open Telemetry application programming interfaces (APIs) exist for all major languages and even exist for cloud native components such as SideCars and service meshes. Accordingly, aspects of the can be utilized across just about any component found in the cloud.

Specifically, according to one or more embodiments described herein, a method includes determining, by a device executing an observability extension that monitors an application, variables of the application that specify an accessible location for a software bill of materials of the application and generating, by the observability extension, an indication of the accessible location for the software bill of materials of the application. The method further includes detecting, by the observability extension, creation of an observability-based data structure during monitoring of execution of the application and inserting, by the observability extension, the indication of the accessible location for the software bill of materials of the application into the observability-based data structure for transmission to an end recipient of the observability-based data structure.

As described below, therefore, the techniques herein may thus take an application without human intervention, and have a fully functional and robust Open Telemetry instrumentation system. Compared to current systems, where developers can manually go into an application and add instrumentation to trace transactions, etc., the techniques herein do not require access to the source code, and do not require any manual instrumentation. Also, the techniques herein work without being limited to frameworks where engineers have spent months combing over the locations to instrument for starting/ending spans for the trace (i.e., every framework required someone to download the source and find the locations to inject Open Telemetry API/SDK code for tracing).

The techniques herein thus alleviate massive manual effort, and can be more accurate, minimizing human errors in the process. The techniques herein also can adapt to application changes/modifications, and work for any application or framework out of the box without ever having seen the source code before.

Figure 4:
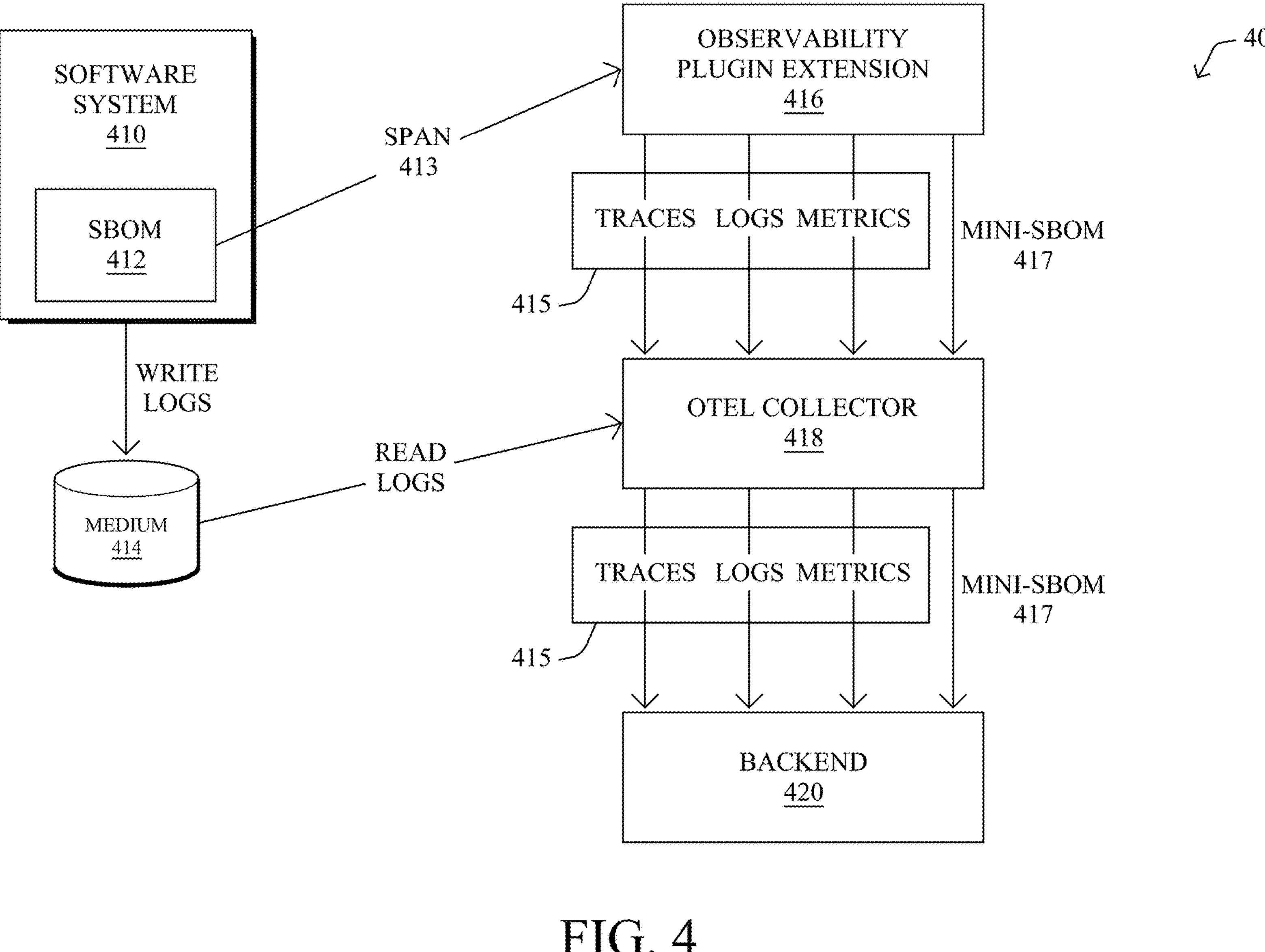
FIG. 4 illustrates an example computing architecture for Software Bill of Materials (SBOMs) telemetry extensions for full stack observability in accordance with one or more embodiments described herein.

Operationally, and according to various embodiments, FIG. 4 illustrates an example computing architecture 400 in accordance with one or more embodiments described herein. As shown in FIG. 4, the computing architecture 400 includes a software system 410, which includes SBOM 412. The computing architecture 400 further includes a medium 414 (e.g., a memory resource, filesystem, database, stdout PIPE, etc.), an observability plugin extension 416, an OTEL collector 418, and a backend 420 portion.

The observability plugin extension 416 can be provided as an extension to the Open Source Open Telemetry Agent (https://github.com/open-telemetry/opentelemetry-java-instrumentation), which is widely used by various cloud monitoring as a service providers. Accordingly, aspects of the present disclosure can assist in the full stack observability (FSO) landscape by readily interfacing with OTEL across a wide range of services.

As mentioned above, SBOMs, such as the SBOM 412, have emerged as a key building block in software security and software supply chain risk management. In general, a SBOM is a nested inventory, which can be thought of as a list of ingredients that make up software components of the software system 410.

OTEL generally refers to a collection of tools, application programming interfaces (APIs), and/or software development kits (SDKs). OTEL may be used to instrument, generate, collect, and/or export telemetry data (e.g., metrics, logs, and traces) that assist in analyzing the performance and behavior of the software system 410, as well as applications that are executed by the software system 410.

As used herein, the terms “application” and “applications” generally refer to a computer program or computer programs that are designed to carry out a specific task or tasks other than task(s) relating to the operation of the computer itself. In particular, an “application” can refer to a collection of executable computer code that is provided to, or is integrated into, the software system 410. As a result, the “application” or “applications” discussed herein can refer to any collection computer code that is executed by, or provided by, the software system 410.

By way of example, the applications mentioned herein can be host applications that run on various computing systems, such as a physical computer (e.g., a desktop, a laptop, a smartphone, a tablet, a phablet, etc.), a virtual computer (e.g., a thin client, a virtual machine, a Linux container, etc.), a data center (e.g., rack server, supercomputer, etc.), and/or a software defined data center (e.g., bare metal server), etc. Accordingly, the applications described herein can be locally provided host applications, virtually provided host applications, and so on and so forth.

Notably, as will be understood by those skilled the art, an OTEL “span” is a data structure which represents a unit of work or an operation (e.g., within a transaction). Spans are the building blocks of traces, which are essential to understanding the full “path” a request takes in an application. Each Span is an observability-based data structure that encapsulates a number of states, such as an operation name, start and end timestamps, and a number of attributes (key-value pairs), among other fields (e.g., events, link, and so on).

In particular, as will be appreciated, a trace is generally a collection of parent/child spans, which are created during a transaction process. Each Span defines a “transition” in the trace (e.g., a web service call, web service entry, thread transition, etc.) process. Each span carries information about the span in “attributes,” as illustrated in the following pseudocode:

```
//Get current Span
Span span = Span.current( );
//Add custom attributes to Span
span.setAttribute("SchoolName", schoolname);
```

These attributes are eventually transmitted via an exporter to the backend 420 (e.g., backend receivers) via a wire protocol (e.g., via the Open Telemetry protocol (OTLP)—https://opentelemetry.io/docs/specs/otel/protocol/) and processed at the backend 420.

As will be described in more detail below, aspects of the present disclosure provide for creation of on observability plugin extension 416, which, when operating in accordance with the OTEL standard (e.g., https://opentelemetry.io/docs/instrumentation/java/automatic/extensions/) may have the ability to be “SBOM Aware” and/or automatically publish a uniform resource locator (URL) that points to the SBOM 412 of one or more applications associated with the software system 410. In some embodiments, the SBOM 412 pointed to by the URL can be hosted by a company that provides the software system 410 and/or the SBOM 412 can be stored in a public registry or the like. Further, in some embodiments, the observability plugin extension 416 can create span attributes that relate to a “span mini-SBOM” that can also include the SBOM URL associated with the applications and could be accessed directly by, for example, a customer or consumer of the software system 410.

In some embodiments, the SBOM 412 can be built during a continuous integration and continuous delivery (CI/CD) build process. A specific hash value can be generated as part of this process and the specific has value can be stored in the software system 410 (e.g., stored in an application that runs in connection with the software system 410). The specific hash value can be stored in the software system 410 as a property variable and/or environment variable along with a public URL that points to the SBOM 412. For example, the specific hash value can be stored in the software system 410 as a property variable and/or environment variable along with a public URL that points to an SBOM registry associated with a host application and, hence, the SBOM 412. The SBOM registry can be a vendor specific registry or the SBOM registry can be stored in a public registry, among other possible locations. In addition, the CI/CD build process can include uploading the SBOM 412 to the SBOM registry with an associated hash value. In some embodiments, the foregoing processes can be fully automated and therefore performed in the absence of interaction from a user or software developer.

When an application is deployed (e.g., when an application is executed on the software system 410), the application can be deployed along with OTEL. In addition, the application can be deployed with the observability plugin extension 416 (e.g., with an SBOM aware OTEL extension).

On startup or initiation of the application, the observability plugin extension 416 can perform operations to search for SBOM related variables that may specify the URL associated with the SBOM registry and the specific hash associated with the application. If SBOM related variables are detected, the observability plugin extension 416 is activated. However, if no SBOM related variables are detected, the observability plugin extension 416 may not be activated.

In some embodiments, a span 413 that corresponds to the application is created. In general, the span 413 can be created in connection with initiation of an application running on the software system 410. The span can include information corresponding to discrete events that track the progression of a request that may be initiated by a user of an application associated with the software system 410. Stated alternatively, the span 413 may represent a single operation within a trace. Spans, such as the span 413 can be nested to form a trace tree, as will be appreciated. Further, each trace may contain a root span, which typically describes an entire operation and, optionally, one or more sub-spans for its sub-operations.

The observability plugin extension 416 can detect and/or intercept the creation and/or start of a span (e.g., a span that is created in response to initiation of an application). In some embodiments, the observability plugin extension 416 can include an API that can detect and/or intercept the creation of the span. Further, in accordance with aspects of the present disclosure, the observability plugin extension 416 can inject a URL associated with the SBOM and the span to create a span mini-SBOM (or mini-SBOM 417 for brevity) in accordance with the pseudocode 500 shown in FIG. 5.

For example, in some embodiments, when the span is created the extension can contain code and instrumentation capable of detecting and intercepting the creation and/or start of a span as specified in this non-limiting example application programming interface (API): https://www.javadoc.io/doc/io.opentracing/opentracing-api/0.31.0/io/opentracing/Tracer.SpanBuilder.html. In order to extract the current span, a non-limiting example code such as: https://www.javadoc.io/doc/io.opentracing/opentracing-api/0.31.0/io/opentracing/Span.html could be used. It will be appreciated that these example codes are merely used for illustrative purposes and other codes and/or APIs for detecting, intercepting, and/or extracting the current span are contemplated within the scope of the disclosure.

Once the URL associated with the SBOM (e.g., the SBOM registry) and the span attributes are added to generate the mini-SBOM 417, the attributes and URL (e.g., the mini-SBOM 417) may travel via the OTEL pipeline via the Open Telemetry protocol (OTLP) to the backend 420. In embodiments in which the backend 420 receiver is provided with an intelligence plugin (e.g., a cloud-native full stack observability platform, such as AppDynaimcs Cloud with solutions, etc.), the information associated with the mini-SBOM 417 can be displayed such that a user of the software system 410 can view the mini-SBOM 417 attributes on the spans in the trace. In addition, a link can be provided for each span to allow the user to easily launch to the SBOM registry to display the application in which the span was created, among other information associated with the application.

In addition to the above enumerated operations, the computing architecture 400 can perform "normal" OTEL operations. For example, write logs from the software system 410 can be written to a medium 414. These can be provided in the form of read logs to the OTEL collector 418. The OTEL collector can further receive standard telemetry data, such as the traces/metrics/log 415 from the observability plugin extension 416 and can provide the traces/metrics/log 415 to the backend 420.

In some embodiments, various security mechanisms may be implemented in connection with the procedures and/or processes described herein. For example, by essentially making the SBOM for an application public in accordance with the disclosure, there may be concerns that the SBOM information could be utilized by a nefarious actor to determine vulnerabilities in a software system and/or to retrieve competitive information about the software system and applications running thereon.

In order to address these concerns, some embodiments of the present disclosure contemplate various security features. For example, in some embodiments, the application and/or software system vendor may control a public key and may employ asymmetric encryption using the private key for the registry location and the span mini-SBOM. In such embodiments, the public key may only be made available on request and/or could be changed change periodically. Embodiments are not so limited, however, and other security features that will be appreciated by those skilled in the art may be provided in accordance with the disclosure.

FIG. 5 illustrates an example a span mini-SBOM pseudocode (pseudocode 500) in accordance with one or more embodiments described herein. As mentioned above in connection with the discussion of FIG. 4, the observability plugin extension 416 can inject a URL associated with the SBOM and the span to create the pseudocode 500 shown in FIG. 5. Embodiments are not limited to the particular example pseudocode (pseudocode 500) shown in FIG. 5, however, and other coding methodologies that are contemplated within the scope of the disclosure may be used without departing from the scope of the present disclosure.

Figure 6:
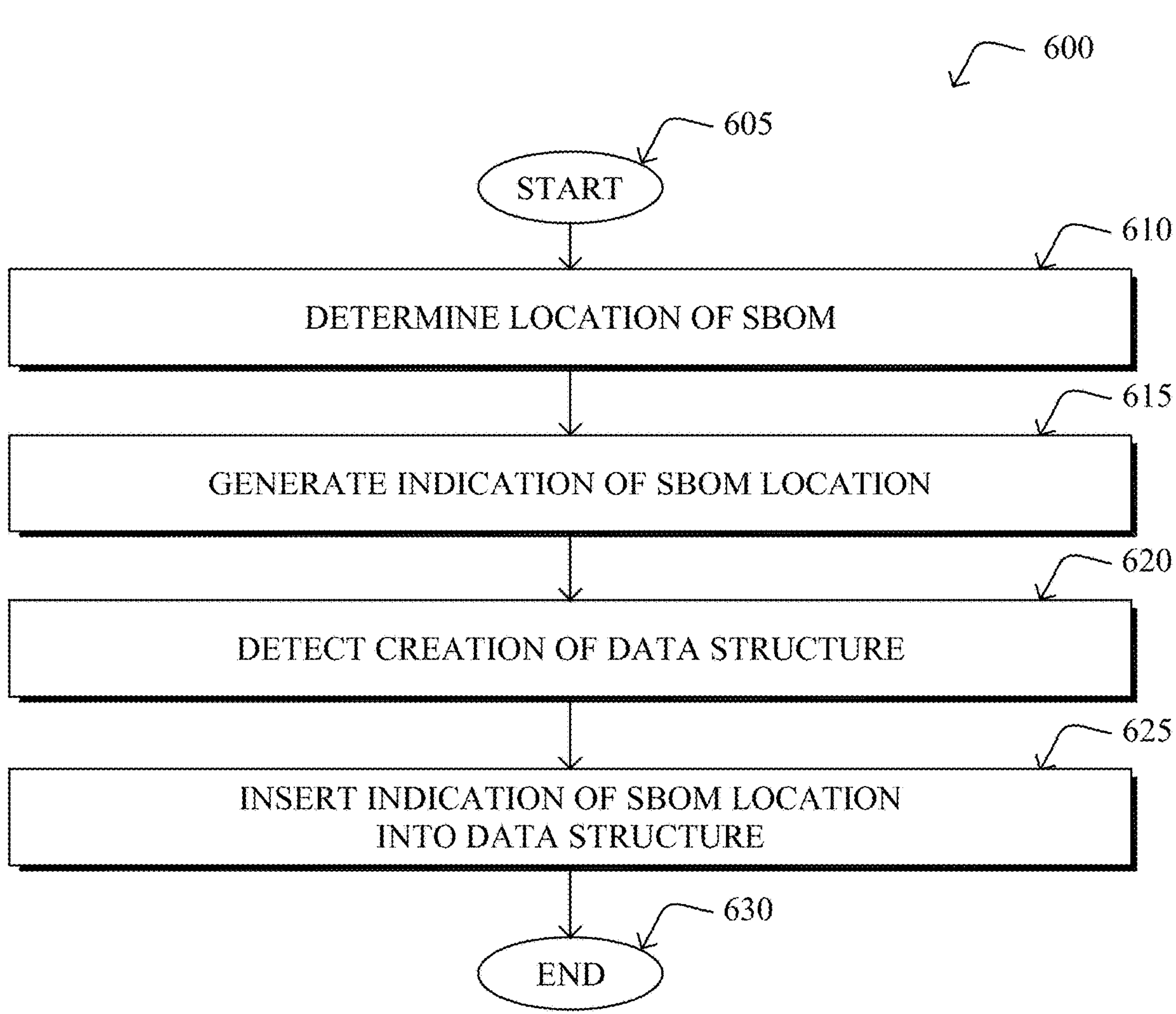
FIG. 6 illustrates an example simplified procedure for SBOM telemetry extensions for full stack observability in accordance with one or more embodiments described herein.

In closing, FIG. 6 illustrates an example simplified procedure for Software Bill of Materials telemetry extensions for full stack observability in accordance with one or more embodiments described herein, particularly from the perspective of either a device or a controller. For example, a non-generic, specifically configured device (e.g., device 200) may perform procedure 600 by executing stored instructions (e.g., process 248, such as an SBOM telemetry process). The procedure 600 may start at step 605, and continues to step 610, where, as described in greater detail above, a device executing an observability extension that monitors an application determines variables of the application that specify an accessible location for a software bill of materials of the application. In some embodiments, the observability extension can be an Open Telemetry extension and/or the variables can comprise hashes and/or uniform resource locators, among other possibilities.

The accessible location can be a private registry managed by an application provider or a centralized public registry for multiple application providers, companies, developers, etc. In some embodiments, the observability extension may deactivate if no variables in the application that specify an accessible location for a software bill of materials of the application are detected.

At step 615, as described in greater detail above, the observability extension generates an indication of the accessible location for the software bill of materials of the application. In some embodiments, the indication of the accessible location for the software bill of materials of the application can include a uniform resource locator to a software bill of materials registry. Further, as described above, the indication can further include a hash specific to the application to locate the actual software bill of materials associated with the application from among a plurality of other application software bill of materials.

At step 620, as described in greater detail above, the observability extension detects creation of an observability-based data structure during monitoring of execution of the application. In some embodiments, the observability-based data structure can be extracted using an application programming interface. In addition to, or in the alternative, the observability-based data structure can comprise an Open Telemetry span. At step 625, as described in greater detail above, the observability extension inserts the indication of the accessible location for the software bill of materials of the application into the observability-based data structure for transmission to an end recipient of the observability-based data structure. In some embodiments, transmission of observability data structure can be facilitated via an Open Telemetry pipeline over an Open Telemetry protocol to an Open Telemetry backend.

As discussed above, in some embodiments, the software bill of materials variables associated with the application can be built during a continuous integration and continuous delivery (CI/CD) build process and can be stored in a software bill of materials registry.

In order to address the security concerns discussed above, in some embodiments, the observability extension can add one or more security measures to access the accessible location for the software bill of materials of the application. In such embodiments, the security measures can include an application vendor controlled public key that utilizes asymmetric encryption using private key, among other security protocols and/or methodologies.

In some embodiments, the observability extension can generate a mini-software bill of materials containing one or more additional software bill of materials-related variables, as discussed above. This mini-software bill of materials can be included in the indication of the accessible location for the software bill of materials of the application. As discussed above, the one or more additional software bill of materials-related variables can be selected from a group that include a span type, a span purpose, a span creator, an indication as to whether the span includes outbound web service calls, an indication as to whether the span includes outbound database updates, and/or an indication as to whether the span includes outbound database reads, among other variables.

The procedure 600 may then end in step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for Software Bill of Materials telemetry extensions for full stack observability. In particular, the techniques herein provide mechanisms that allow access to SBOMs associated with software systems in an automated and streamlined manner. For example, aspects of the present disclosure can allow for observability to SBOMs through detection, retrieval, and/or analysis of telemetry data associated with SBOMs. Such detection, retrieval, and/or analysis can include automatic detection of Open Telemetry (OTEL) spans generated during application tracing of mission critical application transactions to retrieve and/or analyze SBOMS, as detailed above.

In particular, the techniques herein are a much easier, much more flexible, much more scalable and adaptive solution than currently available by the Open Telemetry Community. Also, the techniques herein apply to both applications and frameworks, allowing automatic detection of OTEL spans generated during application tracing of mission critical application transactions without any need for customer input. As noted above, also, the techniques herein are truly automated, alleviating many hours of labor by engineers and developers, and, in fact, do not need access to the source code at all (only looking at the application and the framework). The observability of SBOMs is also a vast improvement in terms of the visibility of spans, both in applications and software systems where such visibility is or will soon be subject to government mandate and to consumers, generally allowing greater advancement in the adoption of Open Telemetry.

Illustratively, the techniques described herein may be performed by hardware, software, and/or firmware, such as in accordance with the illustrative SBOM telemetry process (process 248), which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

Additionally, the techniques herein may be provided as a software as a service (SaaS) service to companies to "auto instrument" various facets of Open Telemetry regardless of changes-regardless of frameworks used. The techniques herein may also be provided as CI/CD plugins.

According to the embodiments herein, an illustrative tangible, non-transitory, computer-readable medium herein may have computer-executable instructions stored thereon that, when executed by a processor on a computer, may cause the computer to perform a method comprising: determining, by a device executing an observability extension that monitors an application, variables of the application that specify an accessible location for a software bill of materials of the application; generating, by the observability extension, an indication of the accessible location for the software bill of materials of the application; detecting, by the observability extension, creation of an observability-based data structure during monitoring of execution of the application; and inserting, by the observability extension, the indication of the accessible location for the software bill of materials of the application into the observability-based data structure for transmission to an end recipient of the observability-based data structure.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: determine variables of an application that specify an accessible location for a software bill of materials of the application; generate an indication of the accessible location for the software bill of materials of the application; detect creation of an observability-based data structure during monitoring of execution of the application; and insert the indication of the accessible location for the software bill of materials of the application into the observability-based data structure for transmission to an end recipient of the observability-based data structure.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

determining, by a device executing an observability extension that monitors an application, one or more of an environment variable or an application property variable of the application that specifies an accessible location for a software bill of materials of the application;

generating, by the observability extension, an indication of the accessible location for the software bill of materials of the application based on a value of the one or more of the environment variable or the application property variable;

intercepting, by the observability extension, creation of an observability-based data structure during monitoring of execution of the application, wherein the observability-based data structure comprises an observability span; and inserting, by the observability extension, the indication of the accessible location for the software bill of materials of the application into the observability-based data structure as a span attribute for transmission to an end recipient of the observability-based data structure.

2. The method as in claim 1, wherein the indication of the accessible location for the software bill of materials of the application comprises a uniform resource locator to a software bill of materials registry.

3. The method as in claim 2, wherein the indication further comprises a hash specific to the application to locate an actual software bill of materials associated with the application from among a plurality of other application software bill of materials.

4. The method as in claim 1, wherein the variables comprise hashes or uniform resource locators, or both.

5. The method as in claim 1, wherein the accessible location is a private registry managed by an application provider or a centralized public registry for multiple application providers.

6. The method as in claim 1, wherein the observability extension deactivates if no variables in the application that specify an accessible location for a software bill of materials of the application are detected.

7. The method as in claim 1, wherein software bill of materials variables associated with the application are built during a continuous integration and continuous delivery build process and are stored in a software bill of materials registry.

8. The method as in claim 1, further comprising:

extracting the observability-based data structure using an application programming interface.

9. The method as in claim 1, wherein the observability extension is an Open Telemetry extension.

10. The method as in claim 1, wherein the observability-based data structure is an Open Telemetry span.

11. The method as in claim 1, further comprising:

performing transmission of observability data structure via an Open Telemetry pipeline over an Open Telemetry protocol to an Open Telemetry backend.

12. The method as in claim 1, further comprising:

adding one or more security measures to access the accessible location for the software bill of materials of the application.

13. The method as in claim 12, wherein the one or more security measures include an application vendor controlled public key that utilizes asymmetric encryption using private key.

14. The method as in claim 1, further comprising:

generating, by the observability extension, a mini-software bill of materials containing one or more additional software bill of materials-related variables; and including the mini-software bill of materials in the indication of the accessible location for the software bill of materials of the application.

15. The method as in claim 14, wherein the one or more additional software bill of materials-related variables includes at least one variable selected from a group comprising: a span type, a span purpose, a span creator, an indication as to whether a span includes outbound web service calls, an indication as to whether a span includes outbound database updates, and an indication as to whether a span includes outbound database reads.

16. A tangible, non-transitory, computer-readable medium having computer-executable instructions stored thereon that, when executed by a processor on a computer, cause the computer to perform a method comprising:

determining, by an observability extension that monitors an application, one or more of an environment variable or an application property variable of the application that specifies an accessible location for a software bill of materials of the application;

generating, by the observability extension, an indication of the accessible location for the software bill of materials of the application based on a value of the one or more of the environment variable or the application property variable;

intercepting, by the observability extension, creation of an observability-based data structure during monitoring of execution of the application, wherein the observability-based data structure comprises an observability span; and inserting, by the observability extension, the indication of the accessible location for the software bill of materials of the application into the observability-based data structure as a span attribute for transmission to an end recipient of the observability-based data structure.

17. The tangible, non-transitory, computer-readable medium as in claim 16, wherein the indication of the accessible location for the software bill of materials of the application comprises a uniform resource locator to a software bill of materials registry.

18. The tangible, non-transitory, computer-readable medium as in claim 17, wherein the indication further comprises a hash specific to the application to locate an actual software bill of materials associated with the application from among a plurality of other application software bill of materials.

19. The tangible, non-transitory, computer-readable medium as in claim 16, wherein the accessible location is a private registry managed by an application provider or a centralized public registry for multiple application providers.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

determine one or more of an environment variable or an application property variable of the application that specifies an accessible location for a software bill of materials of the application;

generate an indication of the accessible location for the software bill of materials of the application based on a value of the one or more of the environment variable or the application property variable;

intercept creation of an observability-based data structure during monitoring of execution of the application, wherein the observability-based data structure comprises an observability span; and insert the indication of the accessible location for the software bill of materials of the application into the observability-based data structure as a span attribute for transmission to an end recipient of the observability-based data structure.

* * * * *